United States Patent Office 3,281,323
Patented Oct. 25, 1966

3,281,323
PROCESS FOR PREPARATION OF THE ACTIVE POLLEN ALLERGENS
Yuichi Yamamura, Toyonaka-shi, Japan, assignor of one-half to Torii Yakuhin Kabushiki Kaisha, Toyko-to, Japan, a company of Japan
No Drawing. Filed Dec. 6, 1963, Ser. No. 328,468
Claims priority, application Japan, Jan. 8, 1963, 38/781
8 Claims. (Cl. 167—78)

This invention relates to a process for preparation of active and stable allergens from various kinds of pollens.

There have been proposed many theories for the etiology of allergic diseases and, in fact, it has been supposed that a variety of factors take part in the cause of them. Formerly, the exact elucidation of etiology of these diseases had been considered to be difficult to attain, and the successful treatment, also, had been considered to be difficult to achieve because most of therapeutic methods that were then available were of rather symptomatic nature. Remarkable progress recently made in the field of allergy, particularly as to diagnosis by skin reaction using allergens which are supposed to be the causative factors, however, have made it possible to carry out the precise examination of the cause of these diseases and the specific treatment by desensitization, and, thus, the use of allergens is now believed to be indispensable in the diagnosis and the treatment of allergic diseases.

For such purposes, many kinds of allergens and allergen-extracts are now available, but these are said to have some defects in that they may, in some cases, cause non-specific reactions, that their activity is reduced gradually as the result of aging during storage for a long period of time, and that their potency is readily affected by the conditions of the extraction procedure employed in obtaining them. A process for the preparation of allergens used conventionally consists of either extraction of an active fraction with neutral or alkaline solution and, then, dialysis of the obtained extract for the removal of substances of comparatively lower molecular weight which are responsible for a non-specific reaction, or isolation of an active fraction by addition of acetone. When employing these methods, there cannot be avoided the disadvantages that allergens and allergen-extracts thus prepared contain a variety of components.

This invention relates to a process for the preparation of a fraction of highly specific activity as the allergen from pollens which comprises extracting with acidic solution, adding picric acid and, thus, isolating the active fraction as a picrate. As mentioned above, clinical tests clearly indicated that allergens and allergen-extracts prepared by conventional methods contain a certain amount of non-specific reaction-causing components even after dialysis or other purification techniques. A comparison between the allergen prepared by the process of this invention and that prepared by the conventional method which comprises the extraction process with weakly alkaline solution gave the results shown below.

(1) The allergen of this invention causes weaker reactions to intradermal testing on normal subjects.

| Intradermal testing | Reactions (diameter) | |
|---|---|---|
| | With allergen of this invention, mm. | With allergen of conventional use, mm. |
| Erythema | ≦10 | ≦20 |
| Wheal | ≦7 | ≦8 |

(2) The allergen of this invention causes more intense reactions to intradermal testing on pollinosis patients.

| Intradermal testing (ragweed pollinosis patients) | Reactions (diameter) | | |
|---|---|---|---|
| | With the allergen of this invention (amount injected: 0.02 ml.) | | With the allergen of conventional use (amount injected: 0.02 ml.) |
| | Nitrogen content 0.21μg./0.02 ml. | Nitrogen content 0.02μg./0.02 ml. | Nitrogen content 0.16μg./0.02 ml. |
| Erythema, mm | 23 | 24 | 18 |
| Wheal, mm | 17 | 15 | 14 |

These results clearly indicate that the allergen of this invention, compared with that of conventional use, has far higher sspecificity and activity upon intradermal testing as proved by the fact that it is ten times as active on the nitrogen content basis.

In order to confirm the characteristics of the allergen of this invention, another investigation was performed on asthmatic patients and the results, which are set forth below showed, that the allergen of this invention could cause intense positive reaction in some patients who had not reacted positively to allergen of conventional use was obtained.

| Patients | Reactions (diameter) | | | | | |
|---|---|---|---|---|---|---|
| | With the allergen of conventional use | | With the allergen of this invention | | | |
| | Nitrogen content 0.16μg./0.22 ml. | | Nitrogen content 0.21μg./0.02 ml. | | Nitrogen content 0.02μg./0.02 ml. | |
| | erythema | wheal | erythema | wheal | erythema | wheal |
| 1 | 11 | 7 | 24 | 8 | 9 | 8 |
| 2 | 7 | 7 | 20 | 7 | | |
| 3 | 5 | 5 | 25 | 8 | 5 | 5 |
| 4 | 5 | 5 | 25 | 8 | 7 | 7 |
| 5 | 5 | 5 | 23 | 12 | 12 | 10 |
| 6 | 5 | 5 | 30 | 11 | 10 | 8 |

Summarizing these results, the allergen of this invention can be said to have such characteristic advantages that are listed as follows:

(1) It has high specificity of reaction, which makes an exact diagnosis possible.

(2) It has remarkably high activity in the intradermal testing.

(3) It can be stored for quite a long period of time, as it is obtained in the form of stable powder.

(4) It can be applied with ease by being dissolved at the time of application, because of its excellent solubility.

(5) The process for preparation can be readily standardized, as allergens of constant quality can always be obtained in a constant yield.

As the acidic solution of this invention is used N/10 hydrochloric acid, which prevents the subsequent putrefraction or degeneration of pollens during the extraction procedure. The conventional process in which a neutral or weakly alkaline extracting solution, such as a buffer solution containing glucose or sodium phosphates, is used must be carried out at a low temperature because contamination of the solution has been observed to occur in some cases. On the contrary, the extraction procedure of this invention in which N/10 hydrochloric acid is used as mentioned above does not need to be performed at a low temperature for the prevention of contamination but, rather, can be successfully performed at a higher temperature, such as room temperature or 37° C., and, thus, the extraction procedure can be simplified and the improved extraction condition of higher temperature can be attained, this representing one of the advantages of this invention.

At the end of the extraction procedure, the acidic extract is collected by filtration, is neutralized to pH 7.0 with alkaline solution, and is separated from any precipitate formed by means of centrifugation, and, then, the highly active fraction is obtained by precipitation as picrate from the supernatant by addition of an equal amount of a saturated aqueous solution of picric acid. More precisely, the precipitate thus formed can be regarded as a substance consisting mainly of the picrates of basic proteins among various components extracted by the acidic solution. Since the essential substance of pollen allergens has not yet been identified, and most of the allergen preparations currently available are used in the form of a crude extract for the clinical application mentioned above, the procedure of isolating the highly active fraction as picrate can be considered as one of the advantages of this invention.

The picrate thus obtained is suspended in water and the pH is adjusted to 7.0 to dissolve the picrate, and, then, to the solution thus obtained, there is added acetone to form a precipitate, which is collected by filtration, is washed with acetone repeatedly and is dried. Then, it is dissolved in N/100 hydrochloric acid and is subjected to dialysis against N/1000 hydrochloric acid in order to remove the components which are suspected of being responsible for any non-specific reaction, and, by lyophilizing the inner dialyzate, a stable and highly active allergen is obtained as a powder.

The allergen prepared by the process of this invention is believed to consist mainly of basic protein and has the following chemical and physical properties: the powder obtained by lyophilization is white or whitish in color, is easily soluble in water, and is found to contain some 7% of saccharides (in the glucose equivalent), some 10% of total nitrogen and some 7% of protein nitrogen but no lipid.

The present invention is further illustrated by the following examples.

*Example 1*

Material: Short ragweed pollen.

Process: To 1.5 g. of short ragweed pollen were added 30 ml. of N/10 hydrochloric acid, and this mixture was shaken for 48 hours at a temperature of 37° C., was neutralized to pH 7.0 with N/10 sodium hydroxide and was subjected to filtration with the addition of a small amount of celite. To 35 ml. of the filtrate thus obtained was added slowly 35 ml. (equal amount) of a saturated aqueous solution of picric acid under stirring and the mixture was left to stand in the ice-box for 24 hours. The precipitate thus formed was collected by centrifugation, was dissolved by adjusting the pH to 7.0 with a dilute sodium hydroxide solution, and by adding 10 times its volume of acetone to this solution, a coarse precipitate was formed. The resulting precipitate was collected by centrifugation and was dissolved in 5 ml. of N/100 hydrochloric acid, the solution was subjected to dialysis against N/1000 hydrochloric acid and, by lyophilizing the inner dialyzate, 16 mg. of highly active allergen was obtained as a powder.

*Example 2*

Material: Typha angustata pollen.

Process: To 2 g. of Typha angustata pollen were added 40 ml. of N/10 hydrochloric acid, this mixture was shaken for 48 hours at a temperature of 37° C., and 30 ml. of the supernatant were obtained by centrifugation.

This supernatant was neutralized to pH 7.0 with sodium hydroxide solution, was separated from any precipitate formed by centrifugation, an equal amount of saturated aqueous solution of picric acid was added, and the mixture was left to stand for 24 hours. The precipitate thus formed was collected by centrifugation and was dissolved by adjusting the pH to 7.0 with a dilute sodium hydroxide solution, and by adding 10 times its volume of acetone to this solution, a coarse precipitate was formed. Then, this coarse precipitate was completely freed from picric acid by repetition of dissolution and precipitation by acetone, wherein collection of precipitate was carried out by centrifugation and, then, the final precipitate free of picric acid was dissolved in 5 ml. of N/100 hydrochloric acid, and dialyzed against N/1000 hydrochloric acid for 48 hours. Thus, 40 mg. of a highly active allergen was obtained in the form of powder by lyophilizing the inner dialyzate.

Having described my invention, I claim:

1. In a process for the preparation of an active allergen from a pollen, the steps of extracting said pollen with an aqueous hydrochloric acid solution, neutralizing the resulting extract and separating any precipitate which forms, adding picric acid to the neutralized extract to precipitate the picrate containing said allergen, separating said picrate from said extract, dissolving said picrate in an alkaline solution to free said allergen of picric acid, adding acetone to the resulting solution to precipitate said allergen therefrom and recovering said precipitated allergen.

2. A process as claimed in claim 1 in which said extraction is carried out at from about room temperature to about 37° C.

3. A process for the preparation of an active allergen from a pollen, comprising extracting said pollen with approximately N/10 hydrochloric acid, neutralizing the resulting extract and separating any precipitate which forms, adding picric acid to the neutralized extract to precipitate a picrate containing said allergen, separating said picrate from said extract, dissolving said picrate in an alkaline solution to free said allergen of picric acid, adding acetone to the resulting solution to precipitate said allergen therefrom, recovering said precipitated allergen, purifying said precipitated allergen by dialysis and lyophilizing the dialyzate.

4. A process as claimed in claim 3 in which said extraction is carried out for about 2 days at from about room temperature to about 37° C.

5. A process as claimed in claim 4 in which said N/10 hydrochloric acid is present in an amount of 20 times by volume/weight of said pollen.

6. A process as claimed in claim 5 in which said picric acid is added as a saturated aqueous solution in an amount equal to the weight of said neutralized extract.

7. A process as claimed in claim 6 in which said allergen is freed of picric acid by dissolving in approximately N/10 sodium hydroxide.

8. A process as claimed in claim 7 in which the purification of said allergen free of picric acid is carried out by dissolving it in approximately N/100 hydrochloric acid and dialyzing it against N/1000 hydrochloric acid.

No references cited.

ELBERT L. ROBERTS, *Acting Primary Examiner.*
RICHARD L. HUFF, *Assistant Examiner.*